(12) United States Patent
Kuji et al.

(10) Patent No.: US 7,408,498 B2
(45) Date of Patent: Aug. 5, 2008

(54) SECONDARY SURVEILLANCE RADAR AND ITS INTERROGATION TRANSMISSION METHOD

(75) Inventors: Yoshinori Kuji, Yokohama (JP); Yoshirou Aoki, Yokohama (JP); Hisashi Ootomo, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 280 days.

(21) Appl. No.: 11/219,725

(22) Filed: Sep. 7, 2005

(65) Prior Publication Data
US 2006/0055586 A1    Mar. 16, 2006

(30) Foreign Application Priority Data
Sep. 14, 2004    (JP) .............................. 2004-266363

(51) Int. Cl.
*G01S 13/74* (2006.01)
*G01S 13/00* (2006.01)
(52) U.S. Cl. .............................. 342/37; 342/29; 342/30; 342/32; 342/36; 342/175; 342/195
(58) Field of Classification Search ............. 342/29–51, 342/175, 195; 701/120–122
See application file for complete search history.

(56) References Cited

U.S. PATENT DOCUMENTS

| 5,825,322 | A | 10/1998 | Capozoli |
| 6,211,810 | B1 * | 4/2001 | Schirf .......................... 342/36 |
| 6,222,480 | B1 | 4/2001 | Kuntman et al. |
| 6,285,312 | B1 * | 9/2001 | Thomassen .................. 342/41 |
| 6,542,810 | B2 * | 4/2003 | Lai ............................ 701/120 |
| 7,095,360 | B2 * | 8/2006 | Kuji et al. ..................... 342/29 |

OTHER PUBLICATIONS

John L. Baker, et al., "Mode S System Design and Architecture", Proceedings of the IEEE, vol. 77, No. 11, XP-000101183, Nov. 1, 1989, pp. 1684-1694.
M. C. Stevens, "Secondary Surveillance Radar", Secondary Surveillance Radar, XP-002154909, 1988, pp. 168-171 and pp. 250-275.
"Revision Radar Technique", Institute of electronics, Information and Communication Engineers, 1996, pp. 227-233.
Michael C. Stevens, Secondary Surveillance Radar, ISBN 0-89006-292-7, 1988.

* cited by examiner

*Primary Examiner*—Bernarr E Gregory
(74) *Attorney, Agent, or Firm*—Oblon, Spivak, McClelland, Maier & Neustadt, P.C.

(57) ABSTRACT

An interrogation transmission method of a secondary surveillance radar compares prediction angle ranges for transmitting interrogations with a beam-width of an antenna, and transmits the interrogations at every roll-call period if the prediction angle ranges for transmitting interrogations are narrower than the beam-width of the antenna. In contrast, if the prediction angle ranges for transmitting the interrogations are wider than the beam-width of the antenna, the radar respectively sets a period to transmit the interrogations and a period not to transmit the interrogations until responses can be received, and transmits interrogations at every roll-call period after the responses can be received (even if a receiving error or downlink occurs).

9 Claims, 9 Drawing Sheets

SECONDARY SURVEILLANCE RADAR AND ITS INTERROGATION TRANSMISSION METHOD

CROSS-REFERENCE TO RELATED APPLICATIONS

This application is based upon and claims the benefit of priority from prior Japanese Patent Application No. 2004-266363, filed Sep. 14, 2004, the entire contents of which are incorporated herein by reference.

BACKGROUND OF THE INVENTION

1. Field of the Invention

The present invention relates to secondary surveillance radar (SSR) for surveying a target such as an airplane equipped with a mode S transponder and an air traffic control radar beacon system (ATCRBS) transponder.

2. Description of the Related Art

An SSR mode S is a radar system to capture a variety of items of information owned by an airplane by transmitting an interrogation from a beam antenna of a device to a transponder mounted on a target such as an airplane and receiving a response (cf., for example, documents "ISBN0-89006-292-7", "Revision Radar Technique", issued by Institute of electronics, Information and Communication Engineers, 1996, P. 227-233"). There are two kinds of transponders, which are conventionally used ATCRBS transponder and mode S transponder, and there are a variety of interrogation systems to capture these two kinds of transponders.

In the SSR mode, the SSR divides a beam dwell time into two or more, further divides one of them (referred to as one scheduling period) into an all-call period (period to capture a mode S transponder and an ATCRBS transponder) and a roll-call period (period to transmit selective interrogation to mode S transponder) to capture a target. In a surveillance protocol, the length of a response is 64 (μs) and the length of an interrogation is 19.75 (μs).

And the SSR mode S has a data-link protocol, in this case, the length of replay becomes 120 (μs) and the length of interrogation becomes 33.75 (μs), so that it takes about double of time compared to surveillance. If the data-link protocol is frequently used in the future, there will be a method for simply lengthening the time length of the roll-call period; however, deterioration in detection rate of a conventional ATCRBS transponder will be caused (because of reduction in the number of responses). Therefore, it becomes important how to efficiently capture the target in the beam dwell time so as to capture the mode S transponder while maintaining the detection rate of the ATCRBS transponder.

Conventionally, in the roll-call period, the SSR calculates prediction positions from previous track information of individual airplanes with the mode S transponders mounted thereon and varies a range of an azimuth angle for transmitting an interrogation in accordance with the prediction range among the prediction positions. However, in the case of the short range target, since the range of the azimuth angle for transmitting the interrogation is expanded, the SSR schedules transactions (transmission and reception of interrogation and response) up to the azimuth having a small possibility of receiving the response. And there is a possibility of an occurrence of the problem that the SSR cannot schedule the transactions for the target in a relatively short range within a beam-width of an antenna (generally, indicating an angle range of beam center azimuth ±1.250°), because the SSR schedules transactions prior to a long distance target in the case of congestion of targets at long distances within the corresponding beam.

Furthermore, in the case of use of the data-link protocol, since the length of the interrogation and the length of response become longer than those for surveillance, the time required for the transactions is lengthened and the possibility of an occurrence of an event which cannot be scheduled by the SSR is further increased.

BRIEF SUMMARY OF THE INVENTION

An object of the present invention is to provide a secondary surveillance radar and its interrogation transmission method capable of securing the time for transmitting other interrogations by reducing interrogations toward an azimuth having a small possibility of receiving of responses.

According to a first aspect of the present invention, there is provided a secondary surveillance radar, comprising: transmitting means for repeatedly transmitting interrogation signals from a beam antenna; receiving means for receiving response signals for the interrogation signals; and management processing means for dividing an interrogation repetition cycle into two, which are an all-call period to perform transactions for a transponder of an air traffic control radar beacon system (ATCRBS) and a mode S and a roll-call period to perform selective transactions for a mode S transponder and varying azimuth angle ranges for transmitting interrogations in accordance with prediction position ranges of targets in the roll-call period, wherein the management processing means compares a beam-width of the antenna with the prediction position ranges, continues selective interrogations at every roll-call period if the prediction position rages are narrower than the beam-width, and thins out the selective interrogations at every roll-call period with prescribed intervals if the prediction angle ranges are wider than the beam-width.

According to a second aspect of the present invention, there is provided an interrogation transmission method of a secondary surveillance radar for dividing an interrogation repetition cycle into two, which are an all-call period to perform transactions for a transponder of an air traffic control radar beacon system (ATCRBS) and a mode S and a roll-call period to perform selective transactions for a transponder of the mode S and having a function to vary angle ranges for transmitting the interrogations in accordance with the prediction angle ranges of targets in the roll-call period, comprising: a first step of comparing a beam-width of an antenna with the prediction angle ranges; a second step of continuing selective interrogations at every roll-call period if the prediction angle ranges are narrower than the beam-width in the comparison in the first step; and a third step of thinning out transmissions of selective interrogations at every roll-call period with prescribed intervals if the prediction angle ranges are wider than the beam-width in the comparison in the first step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

At first, prior to an explanation of an embodiment of the present invention, a brief of an SSR mode S and problems of a present interrogation transmission system will be explained specifically.

Figure 1:
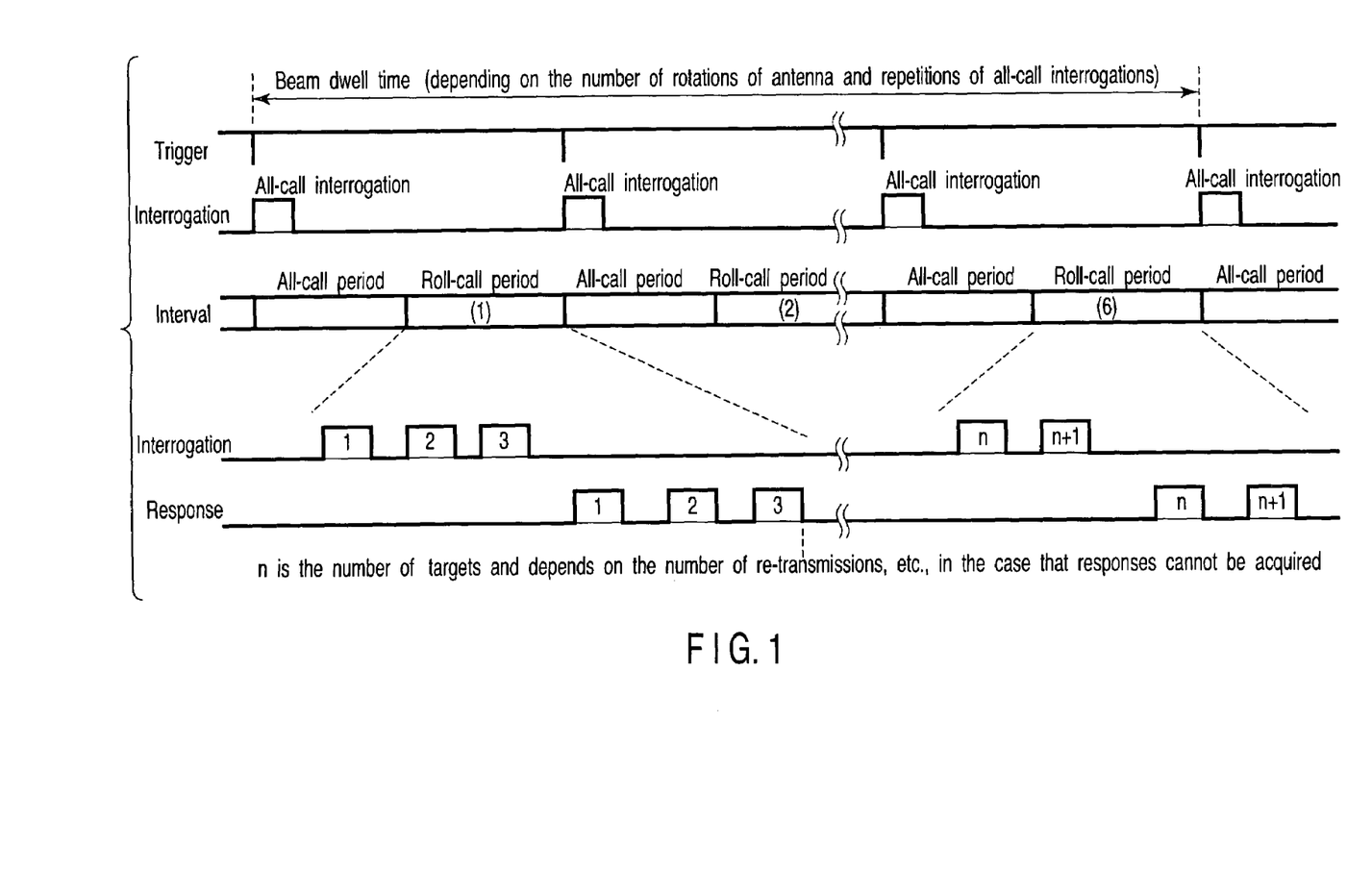
FIG. 1 is an operation timing view for explaining a brief of an SSR mode S to which the present invention is adopted.

FIG. 1 is an operation timing view for explaining a brief of an SSR mode S to which the present invention is adopted. In the SSR mode S, as shown in FIG. 1, an SSR divides a beam dwell time into one or more scheduling periods by using a trigger signal with a constant cycle. And, the SSR divides each scheduling period into two, which are an all-call period (period to capture mode S transponder and ATCRBS transponder) and a roll-call period (period to perform selective interrogation and response to mode S transponder) to transmit an all-call interrogation signal in accordance with a trigger signal in each scheduling period. Thereby, the SSR captures the target within an antenna beam. Here, in FIG. 1, "n" indicates the number of targets. When the SSR cannot capture a response, it performs re-interrogation to the same target, so that the number of total interrogations becomes "n" or more.

In the mode S, the SSR transmits selective interrogations to each airplane, during the roll-call period, and receives responses to capture airplanes. In the case of use of a surveillance protocol, for transactions of [UF=DF=4 (altitude), UF=DF=5 (identify)], a response length and an interrogation length are 64 (μs) and 19.75 (μs), respectively. Since the response length becomes 120 (μs) and the interrogation length becomes 33.75 (μs) when the data-link functional protocol (Comm A, B, C, D) is used, the functional protocol occupies an almost double or more time. This aspect is shown in FIG. 2.

Figure 2:
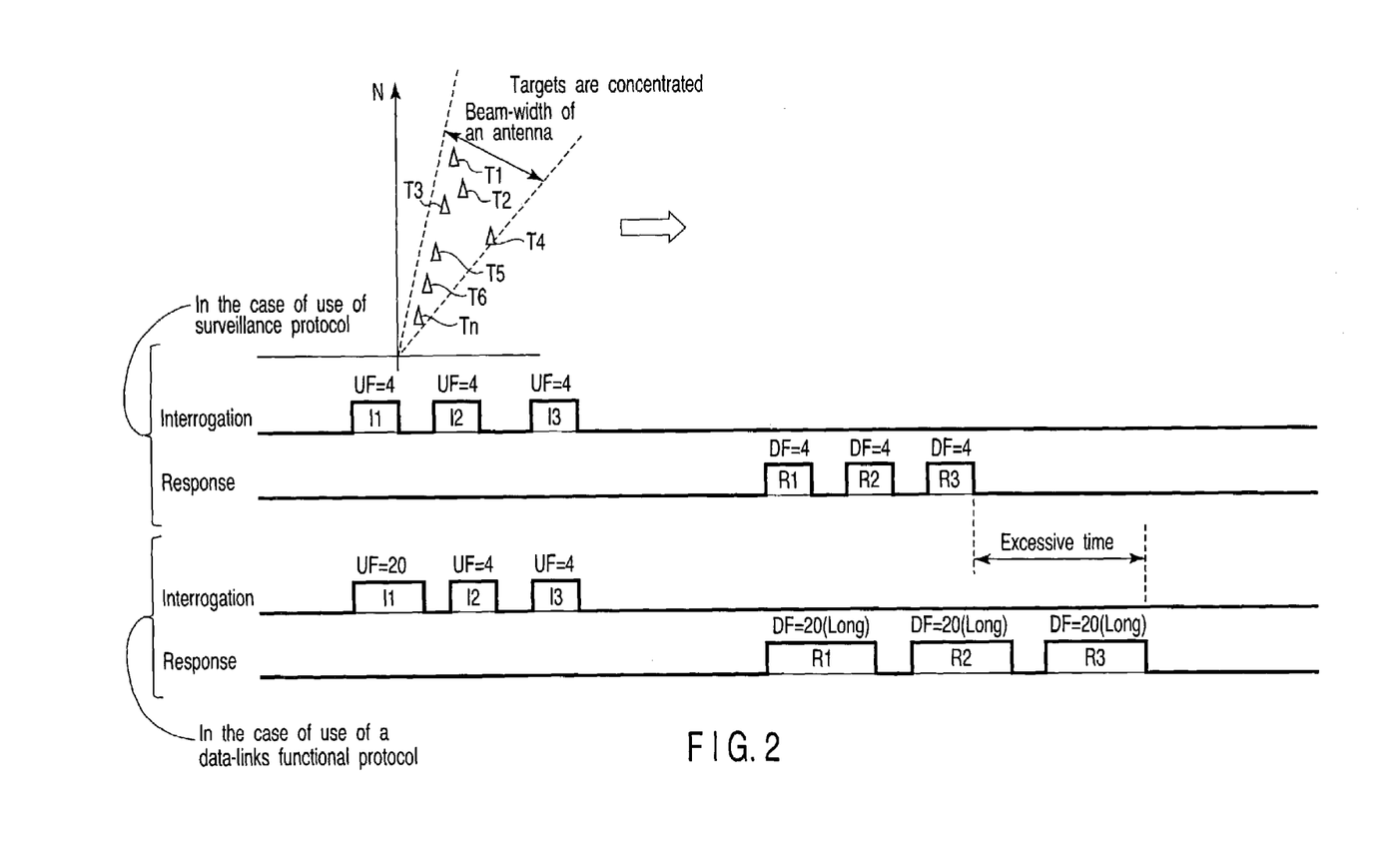
FIG. 2 is an operation timing view for explaining problems of an interrogation transmission system in the SSR mode S to which the present invention is adopted.

If targets (T1-Tn) are concentrated as shown in FIG. 2, it is required to transmit a plurality of interrogations during the beam dwell time and receive their responses, so that if the data-link protocol are used, it will occupy a time longer than that of in the case of use of only the surveillance protocol.

There is a method for simply lengthening the time of the roll-call period; however, deterioration in the detection rate of a conventional ATCRBS transponder will be caused (because of reduction in the number of responses). Therefore, it becomes important how to efficiently capture the mode S transponder within the beam dwell time while maintaining the detection rate of the ATCRBS transponder.

Figure 3A:
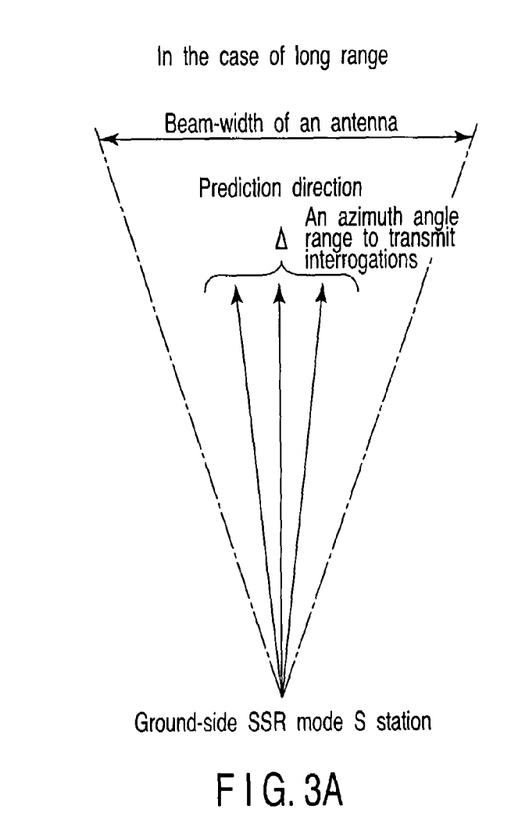
FIG. 3A and FIG. 3B are schematic diagrams for showing aspects of control of azimuth angle ranges for prediction-transmitting interrogations in interrogation transmission systems in a present state, respectively.
Figure 3B:
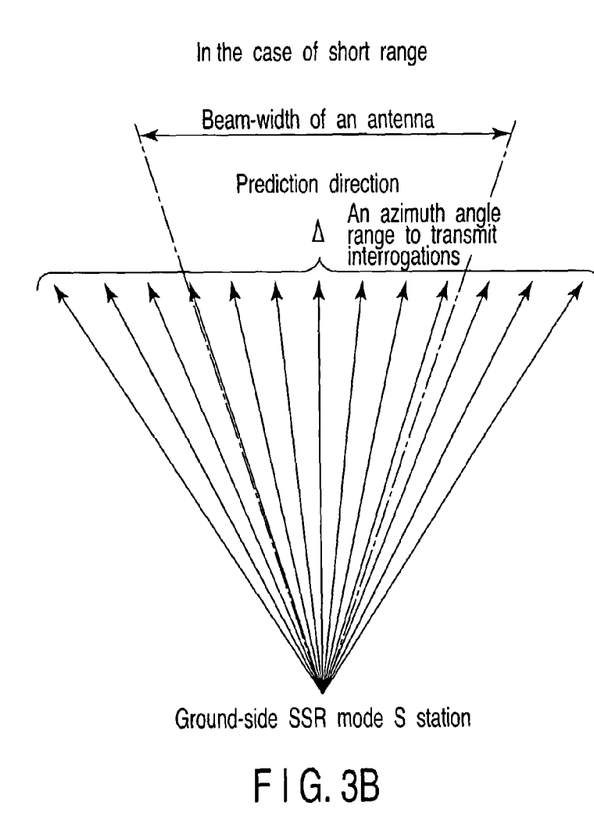

The SSR varies an angle range for transmitting interrogations in accordance with the prediction range, in the roll-call period. Aspects of control of interrogation transmission ranges in the conventional interrogation signal transmission system are shown in FIGS. 3A, 3B. In an algorithm in the conventional transmission system, the SSR transmits the interrogation signals at every roll-call period until responses can be received from the targets within the prediction azimuth angle ranges. In this case, the azimuth angle ranges to transmit the interrogations become narrow and wide for the targets at long and short ranges, respectively.

Otherwise stated, if the target is in a long range, angle components are so small in variation as shown in FIG. 3A that the SSR controls the azimuth angle ranges for transmitting the interrogations to be narrow, and if the target is in a short range, since the prediction angle components are so large in variation as shown in FIG. 3B that the SSR controls the transmission range to be wide. And, for the same targets, the SSR narrows the azimuth angle ranges for transmitting the interrogations, if the capturing by the roll-call is continuous at every scanning.

In the SSR mode S, since the azimuth angle ranges for transmitting the interrogations is widened if the targets are located in a short range or if there is much coast, the occupancy time of an RF channel is lengthened, and the transactions cannot be added into a schedule for the necessary targets in some cases. As an example, in a target arrangement shown in FIG. 4, the ranges of the targets get narrow on order of each target T1, T2, T3, Ta, Tb, Tc, T4, T5, T6 and T7, and the cases that three transactions are available in one roll-call period and that the transmission angle ranges of interrogations for each target are wider than the beam-width are assumed. And the priority of transmission of the interrogations is firstly set such that the azimuth angle ranges for transmitting the interrogations are located within the beam-width of the antenna and secondly set such that the targets are located at long range.

Figure 4:
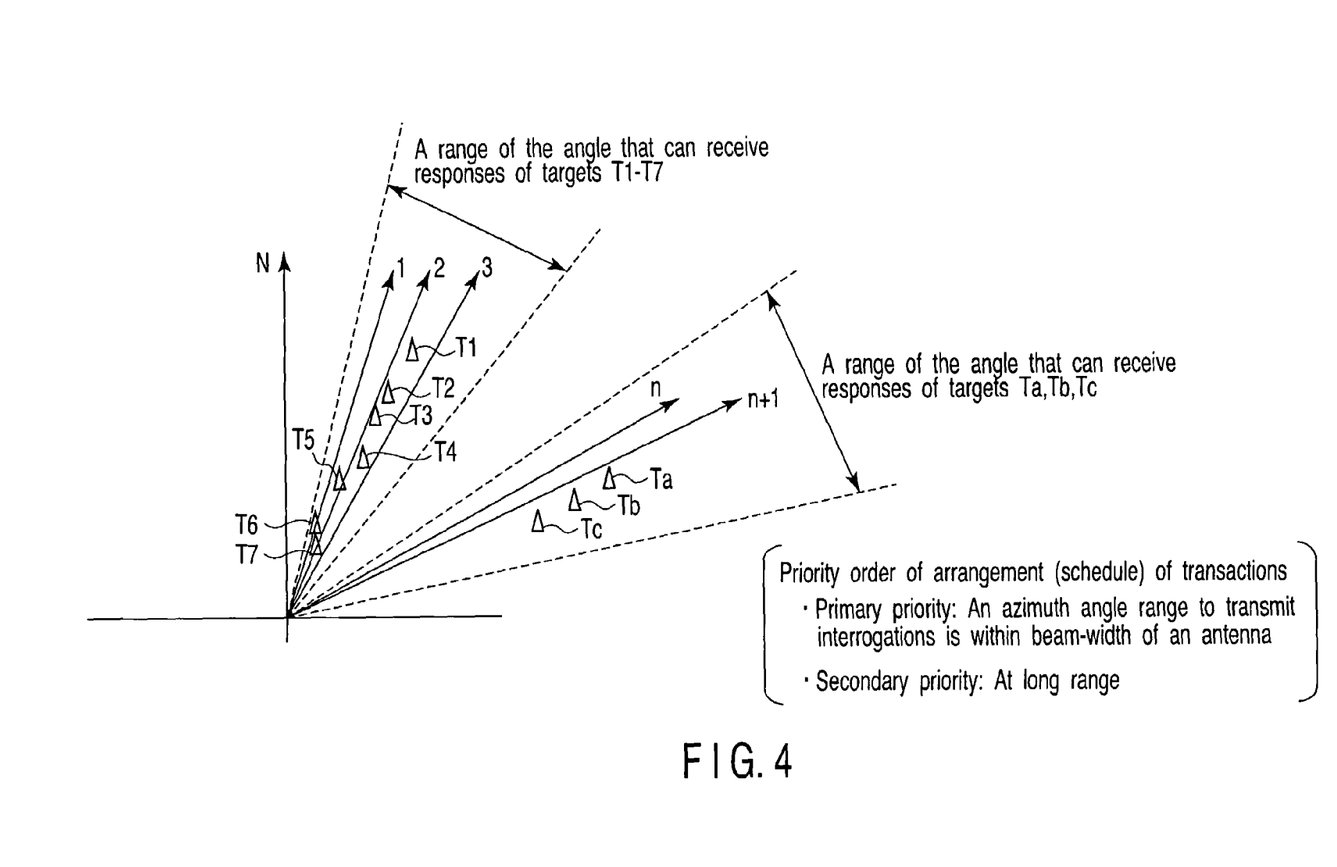
FIG. 4 is a schematic diagram for explaining an example of occurrence in which originally required transactions cannot be scheduled in the SSR mode in a present state.

In this case, at an azimuth of a beam center of the antenna (hereinafter, referred to as antenna azimuth) 1 when the transactions are scheduled, the SSR schedules transactions for the targets T1, T2 and T3. In this case, since the beam width of the antenna is within an angle range by which the SSR can receive responses from T1, T2 and T3, the SSR can capture the targets T1, T2 and T3. At an antenna azimuth 2, the SSR schedules transactions for targets Ta, Tb and Tc, in this case, since the beam-width of the antenna is out of the angle range by which the SSR can receive responses from Ta, Tb and Tc, the SSR cannot capture the targets Ta, Tb and Tc. At an antenna azimuth 3, the SSR successively schedules transactions for Ta, Tb and Tc, also in this case, since beam-width of the antenna is out of the angle range by which the SSR can receive the responses from Ta, Tb and Tc, the SSR cannot capture the targets Ta, Tb and Tc. After this, similarly, from an antenna azimuth 4 to an antenna azimuth n−1, the SSR cannot capture the targets. At the antenna azimuth n, the SSR schedules transactions for Ta, Tb and Tc. In this case, since beam-width of the antenna is within the angle range by which the SSR can receive the responses from Ta, Tb and Tc, the SSR can receive (capture) those responses. At the antenna azimuth n, the SSR schedules transactions for TA, T5 and T6. In this case, since the beam-width of the antenna is out of the angle range by which the responses from T4, T5 and T6 can be received, they cannot be captured by the SSR. Since the beam-width of the antenna is already out of the angle range by which the SSR can receive responses from targets T4, T5, T6 and T7, the SSR cannot receive the responses from the targets T4, T5, T6 and T7 (become coast).

In the conventional system, as described above, the SSR schedules transactions for targets (Ta, Tb and Tc in FIG. 4), which have a small possibility to return responses therefrom in some prediction ranges, so that if the targets are closely spaced, the SSR cannot schedule the transactions for the targets which are at short ranges within the beam and are originally required to be captured, in some cases (T4, T5, T6 and T7 in FIG. 4). In the case of use of data-link protocol, since the time to be required for a transmission and a reception of an interrogation signal and a response signal is lengthened, the occurrence possibility that the SSR cannot schedule the targets is raised.

In this invention, therefore, if the azimuth angle range for transmitting interrogations is narrower than the beam-width of the antenna, the SSR interrogates at every roll-call period in a conventional manner. In contrary, if the prediction range is wider than the beam-width of the antenna, the SSR interrogates at every roll-call period in a conventional manner, if the azimuth angle range is wider than the beam-width, the SSR sets a roll-call period to transmit the interrogations and a roll-call period not to transmit them in turns, it intends to reduce the transmission times of the interrogations. However, in the event of abnormalities of received responses resulted from affections of interference or the like, or in the event of received responses indicating the occurrences of downlink (indicating that prediction range already enters beam-width at this moment), the SSR transmits the interrogations at every roll-call period from this moment.

Hereinafter, an embodiment of the present invention will be explained in detail.

Figure 5:
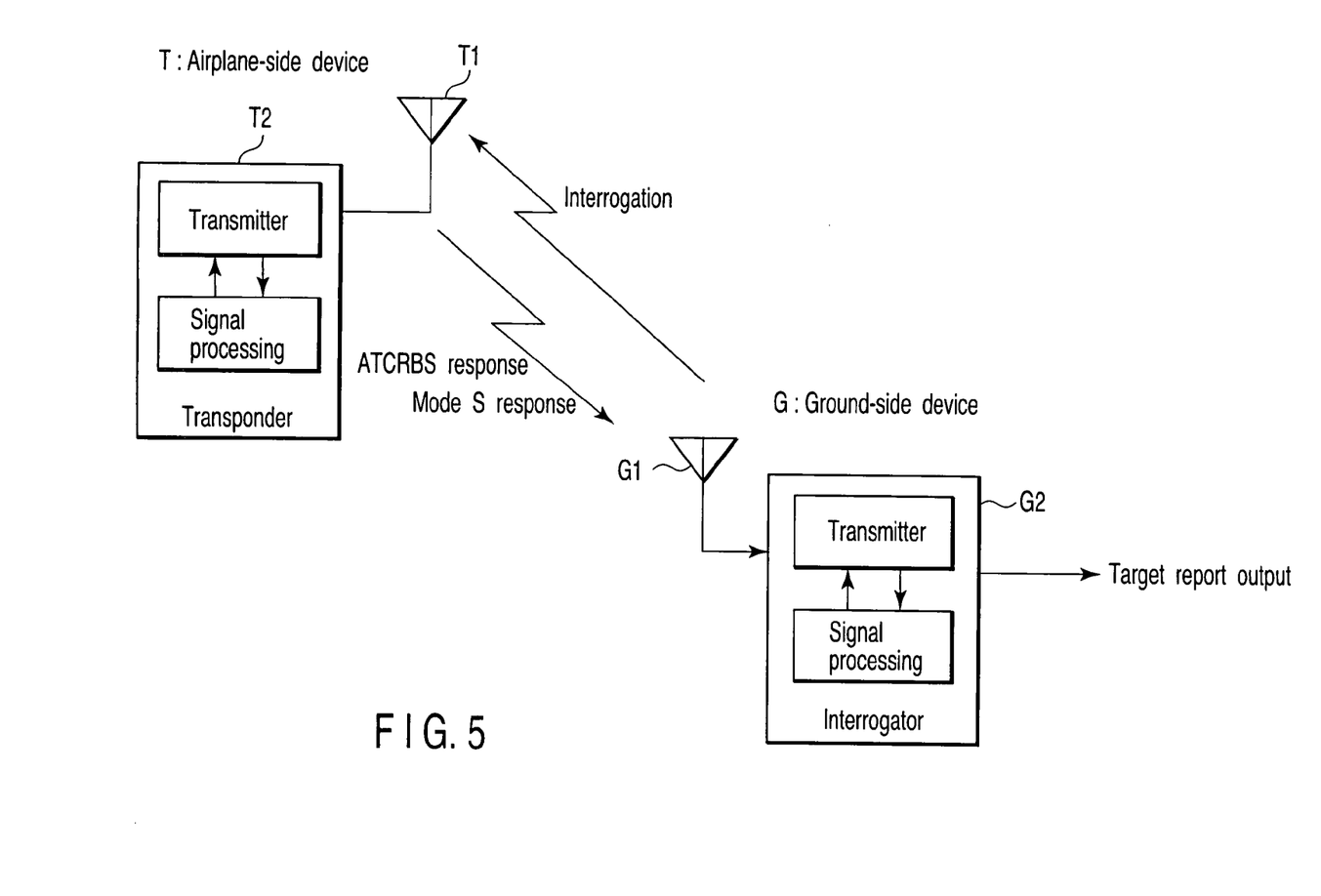
FIG. 5 is a block diagram showing a schematic configuration of an SSR regarding an embodiment of the present invention.

FIG. 5 is a block diagram showing a schematic configuration of an SSR regarding the present invention. In FIG. 5, T is an airplane-side device (target) mounted on a target and G is a ground-side device disposed at a radar site. The device T has a transponder T2 composed of a transmitter and a signal processor and an antenna T1, the device G has an antenna G1 and an interrogator G2 composed of a transmitter and a signal processor. The device T replies a mode S response or an ATCRBS response to an interrogation signal transmitted from the device G, the device G receives its response signal to analyze the response signal and creates a target report of an airplane with the device T mounted thereon to output it.

Figure 6:
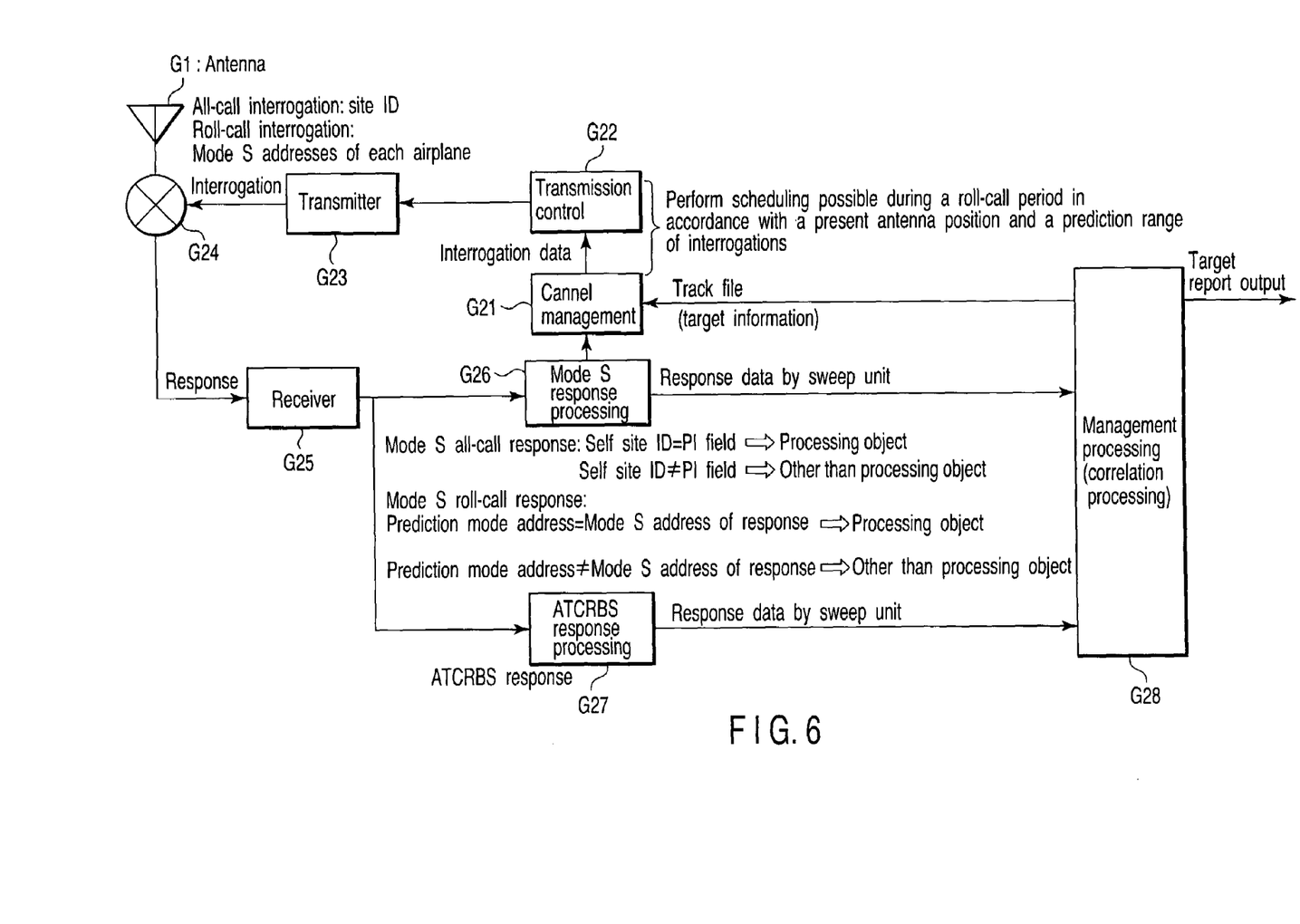
FIG. 6 is a block diagram showing a concrete configuration of a ground-side device G shown in FIG. 5.

FIG. 6 is a processing block diagram showing a concrete configuration of the forgoing device G. At first, after starting operations, a channel management unit G21 and a transmission control unit G22 plan a schedule of transactions possible to be executed in the roll-call period in accordance with the present antenna position and the prediction range of the interrogations to generate interrogation data in accordance with the schedule. This interrogation data is outputted in accordance with the schedule result to be power-amplified by a transmitter G23, then, transmitted toward a prescribed coverage from an antenna GI through a circulator G24.

On the other hand, a response signal received at the antenna G1 is reception-detected by a receiver G25 through the circulator 24, then, transmitted to a mode S response processor G26 and an ATCRBS response processor G27. The processor G26 detects each response from the reception signal and captures response data by sweep unit to transmit it to a management processor G28 while instructing occurrences of interrogation data of all-call and roll-call in the mode S to the management unit G21.

On the other hand, the response processor G27 detects an ATCRBS response from the response signal and captures the response data by sweep unit to transmit it to the management processor G 28.

The processor G28 manages the mode response data captured at each processor G26, G27 and the ATCRBS response data by sweep unit and generates target information through each correlation processing to output it as report data at every prescribed period. The target information is put together in a track file to notify it as a creation parameter of interrogation data to the management unit G21.

According to the foregoing configuration, hereinafter, a flow of an interrogation transmission system in the mode S will be explained by referring to FIG. 7, FIG. 8A and FIG. 8B.

Figure 7:
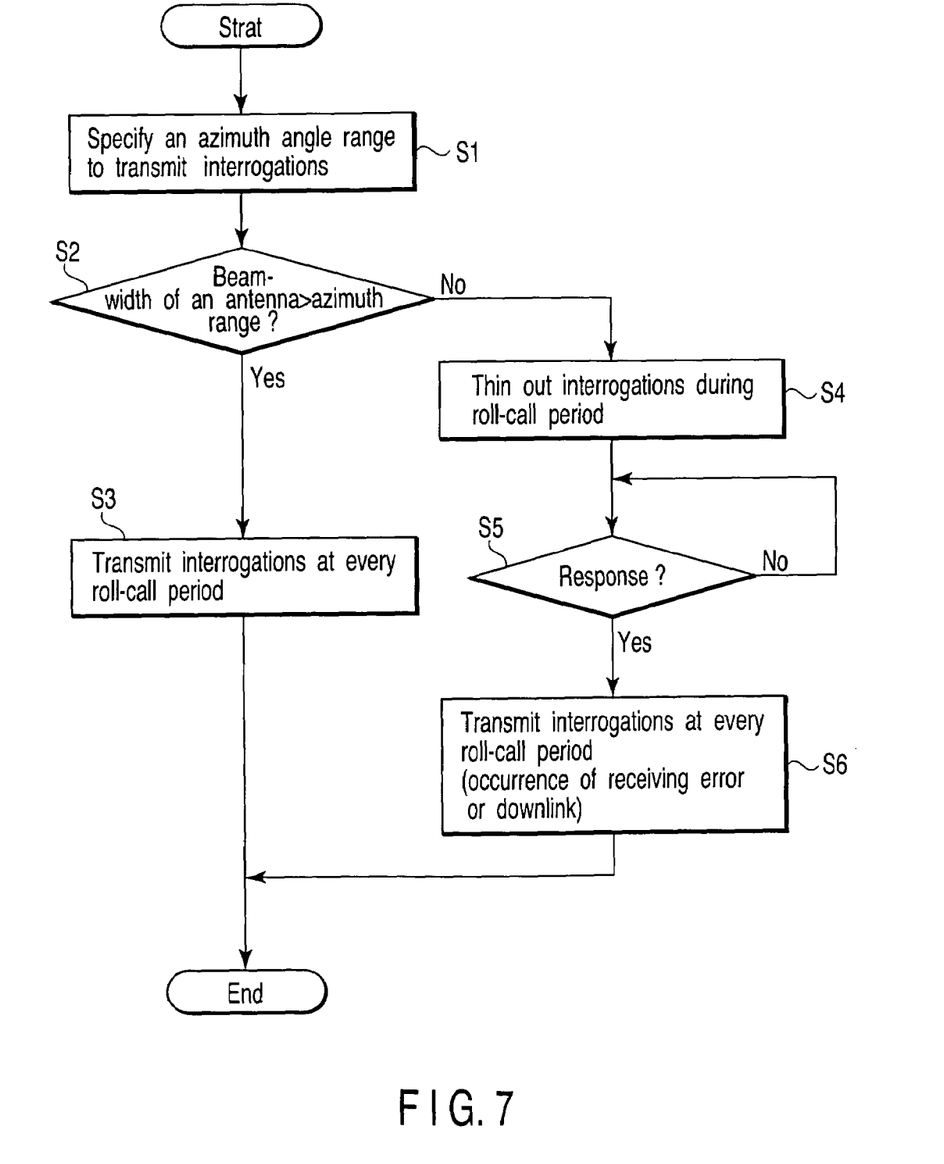
FIG. 7 is a flow chart for explaining processing procedures of an interrogation transmission system of the SSR mode S being a feature of the present invention.
Figure 8A:
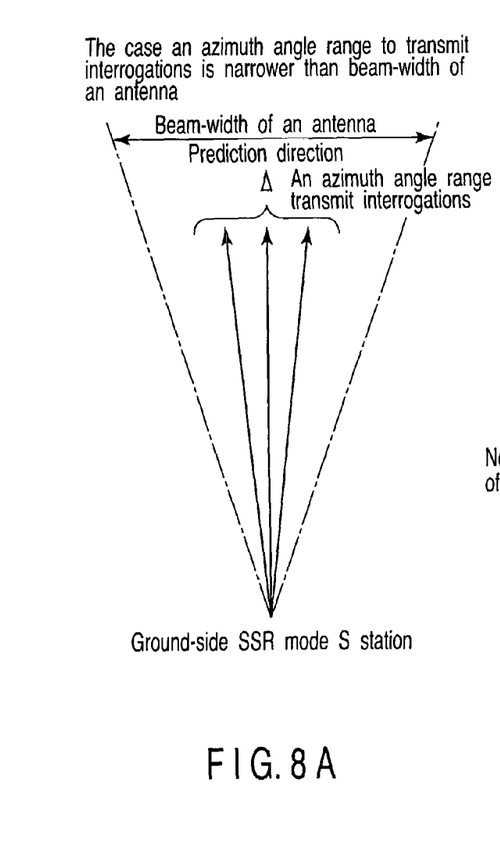
FIG. 8A and FIG. 8B are schematic diagrams for explaining the interrogation transmission system of the SSR mode S being the feature of the present invention, respectively.
Figure 8B:
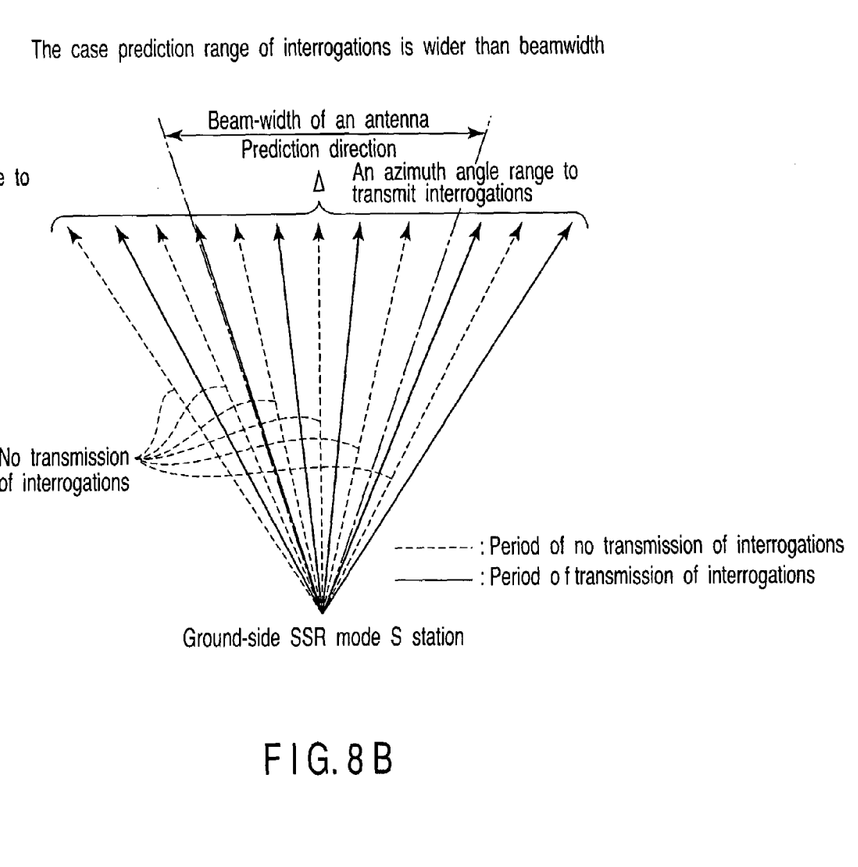

At first, as shown in FIG. 7, the management unit G21 specifies an azimuth angle range for transmitting interrogations on the basis of interrogation timing instructed from the response processor G26 and the track file of the management processor G28 (step S1) and compares it with the beam-width of the antenna (step S2). At this time, if the azimuth angle range for transmitting the interrogations is narrower than the beam-width, the device G transmits the interrogations at every roll-call period as shown in FIG. 8A (step S3). In contrast, if the azimuth angle range of the interrogations is wider than the beam-width, the device G sets periods to transmit interrogations and not to transmit the interrogations, respectively (step S4). Here, the reception of the foregoing response is confirmed (step S5), after confirming the reception of the response, the device G transmits the interrogations at every roll-call period (it is similar in the case of occurrence of receiving error or downlink) (step S6).

As the result of adoption of the foregoing interrogation transmission system to the mode S, the effects are obtained as follows.

Figure 9:
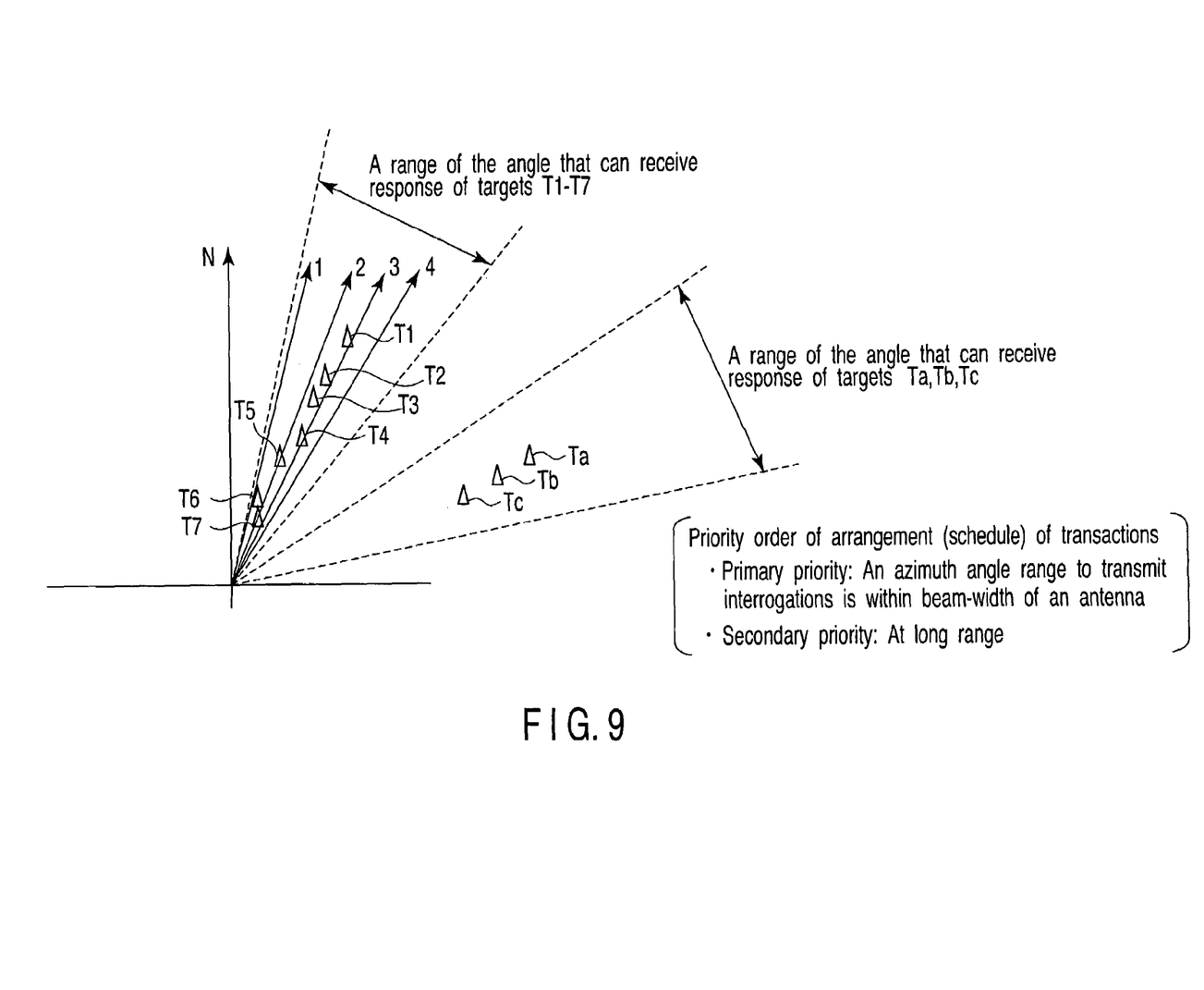
FIG. 9 is a schematic diagram showing an example of effect in the case of adoption of the interrogation transmission system shown in FIG. 7.

At an antenna azimuth L1, in FIG. 9, the device G schedules the transactions for the targets T1, T2 and T3 to perform response reception (capturing). At an antenna azimuth L2, the device G schedules transactions for the targets Ta, Tb and Tc; however in this case, since these targets are located out of antenna beam range in which the responses therefrom can be received, the device G cannot receive the responses from the targets. At an antenna azimuth L3, the device G schedules transactions for the targets Tb, Tc and T4. At this time, the device G cannot receive responses from the targets Tb and Tc, but the device G can receive (capture) the response from the target T4. At antenna azimuth L4, the device G schedules transactions for targets Ta, Tc and T5. At this time, the device G cannot receive the responses from the targets Ta and Tc, but the device G can receive (capture) the response from the target T5. In other words, the device G can schedule the transmission of interrogations for the targets T4-T7.

As the result of change of the interrogation transmission system as stated above, the device G can reduce the interrogations for the azimuth from which responses hardly be replied, so that the device G can utilize the wasted time for scheduling other transactions. Even on the assumption of the case in FIG. 9, the device G has no need to keep scheduling only for the targets Ta, Tb, Tc (targets which have not entered the beam-width yet), the device G can schedule even for other targets T3, T4, etc. (targets which have already entered beam-width).

Accordingly, the SSR with the interrogation transmission system configured as mentioned above adopted thereto can easily avoid scheduling targets respectively having small possibilities to make responses regardless of the prediction ranges in the next scanning of targets. Thereby, the SSR can reduce transmissions of interrogations to the azimuth having less possibility of making responses, so that the SSR can secure the time to transmit interrogations for other targets.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A secondary surveillance radar, comprising:
   transmitting means for repeatedly transmitting interrogation signals from a beam antenna;
   receiving means for receiving response signals for the interrogation signals; and
   management processing means for dividing each of interrogation repetition cycles into two time periods, which are an all-call period to perform transactions for a transponder of an air traffic control radar beacon system (ATCRBS) and a mode S and a roll-call period to perform selective transactions for a mode S transponder and varying azimuth angle ranges for transmitting interrogations in accordance with prediction angle ranges of targets in the roll-call period, wherein
   the management processing means obtains and compares a beam-width of the antenna with the prediction angle ranges, performs selective interrogations at every roll-call period if the prediction angles ranges are narrower than the beam-width, and thins out the selective interrogations at every roll-call period by reducing transmission times of the interrogation by prescribed intervals if the prediction angle ranges are wider than the beam-width.

2. The secondary surveillance radar according to claim 1, wherein
   the management processing means thins out the selective interrogations at every roll-call period in an initial state if the prediction angle ranges are wider than the beam-width and transmits interrogations at every roll-call period after confirming receptions of responses.

3. The secondary surveillance radar according to claim 1, wherein
   the management processing means employs conditions, of (1) whether the prediction angle ranges are within the beam-width of the antenna and (2) a range of the targets, as priority information to schedule the transactions.

4. interrogation transmission method of a secondary surveillance radar for dividing each of interrogation repetition cycles into two time periods, which are an all-call period to perform transactions for a transponder of an air traffic control radar beacon system (ATCRBS) and a mode S and a roll-call period to perform selective transactions for a transponder of the mode S and having a function to vary angle ranges for transmitting the interrogations in accordance with prediction angle ranges of targets in the roll-call period, comprising:
   comparing a beam-width of an antenna with the prediction angle ranges;
   performing selective interrogations at every roll-call period if the prediction angle ranges are narrower than the beam-width in the comparison in the comparing; and
   thinning out transmissions of selective interrogations at every roll-call period by reducing transmission times of the interrogations by prescribed intervals if the prediction angle ranges are wider than the beam-width in the comparison in the comparing.

5. The interrogation transmission method of the secondary surveillance radar according to claim 4, wherein
   the thinning out thins out the transmission of the selective interrogations at every roll-call interval with the prescribed intervals in an initial state and transmits interrogations at every roll-call period after confirming receptions of responses.

6. The interrogation transmission method of the secondary surveillance radar according to claim 4, wherein
   the thinning out employs conditions, of (1) whether the prediction angle ranges are within the beam-width of the antenna and (2) a range of the targets, as priority information to schedule the transactions.

7. A secondary surveillance radar, comprising:
   a transmitter that repeatedly transmits interrogation signals from a beam antenna;
   a receiver that receives response signals for the interrogation signals; and
   a management processor that divides each of interrogation repetition cycles into two time periods, which are an all-call period to perform transactions for a transponder of an air traffic control radar beacon system (ATCRBS) and a mode S and a roll-call period to perform selective transactions for a mode S transponder and varying azimuth angle ranges for transmitting interrogations in accordance with prediction angle ranges of targets in the roll-call period, wherein
   the management processor further obtains and compares a beam-width of the antenna with the prediction angle ranges, performs selective interrogations at every roll-call period if the prediction angles ranges are narrower than the beam-width, and thins out the selective interrogations at every roll-call period by reducing transmission times of the interrogation by prescribed intervals if the prediction angle ranges are wider than the beam-width.

8. The secondary surveillance radar according to claim 7, wherein
   the management processor thins out the selective interrogations at every roll-call period in an initial state if the prediction angle ranges are wider than the beam-width and transmits interrogations at every roll-call period after confirming receptions of responses.

9. The secondary surveillance radar according to claim 7, wherein
   the management processor employs conditions of (1) whether the prediction angle ranges are within the beam-width of the antenna and (2) a range of the targets, as priority information to schedule the transactions.

* * * * *